US012567030B1

(12) United States Patent
Michelsen et al.

(10) Patent No.: US 12,567,030 B1
(45) Date of Patent: Mar. 3, 2026

(54) TEST DATA ACQUISITION FRAMEWORK

(71) Applicant: THE TRAVELERS INDEMNITY COMPANY, Hartford, CT (US)

(72) Inventors: Yushen C. Michelsen, South Windsor, CT (US); David Rollins, West Hartford, CT (US); Kristen L. Pacatte, Wolfforth, TX (US); James H. Stevenson, East Flat Rock, NC (US); Rachel Shields, Medford, MA (US); Carl Delmolino, Bloomfield, CT (US)

(73) Assignee: THE TRAVELERS INDEMNITY COMPANY, Hartford, CT (US)

( * ) Notice: Subject to any disclaimer, the term of this patent is extended or adjusted under 35 U.S.C. 154(b) by 495 days.

(21) Appl. No.: 18/063,958

(22) Filed: Dec. 9, 2022

(51) Int. Cl.
*G06Q 10/087* (2023.01)
(52) U.S. Cl.
CPC ................................. *G06Q 10/087* (2013.01)
(58) Field of Classification Search
CPC ................................................... G06Q 10/087
See application file for complete search history.

(56) References Cited

U.S. PATENT DOCUMENTS

| | | | | |
|---|---|---|---|---|
| 2004/0064351 | A1* | 4/2004 | Mikurak | G06Q 30/0269 705/22 |
| 2008/0208897 | A1* | 8/2008 | Lew | G06F 16/2255 |
| 2013/0144757 | A1* | 6/2013 | Bauer | G06K 17/00 705/26.61 |
| 2013/0339185 | A1* | 12/2013 | Johnson | H04L 67/104 705/26.8 |
| 2014/0331225 | A1* | 11/2014 | Helander | H04L 63/1433 718/1 |
| 2018/0167475 | A1* | 6/2018 | Agarwal | H04L 63/101 |
| 2023/0106027 | A1* | 4/2023 | Knott | G06F 11/0775 705/7.21 |

* cited by examiner

*Primary Examiner* — Fahd A Obeid
*Assistant Examiner* — Jessica E Sullivan
(74) *Attorney, Agent, or Firm* — MH2 Technology Law Group, LLP

(57) ABSTRACT

A method, a computing system, and a non-transitory computer-readable storage medium are provided for satisfying a request for test data. A computing system receives a request for test data. Responsive to determining that information related to the test data does not exist in an inventory database, a number of operations are performed. According to the operations, when at least one function application program interface exists for satisfying the request, the computing system routes the request to one or more appropriate processors executing one or more appropriate function application program interfaces. The one or more appropriate processors execute the at least one function application program interface to satisfy the request. The computing system notifies an originator of the request that the request for the test data is successfully completed.

13 Claims, 15 Drawing Sheets

FIG. 9

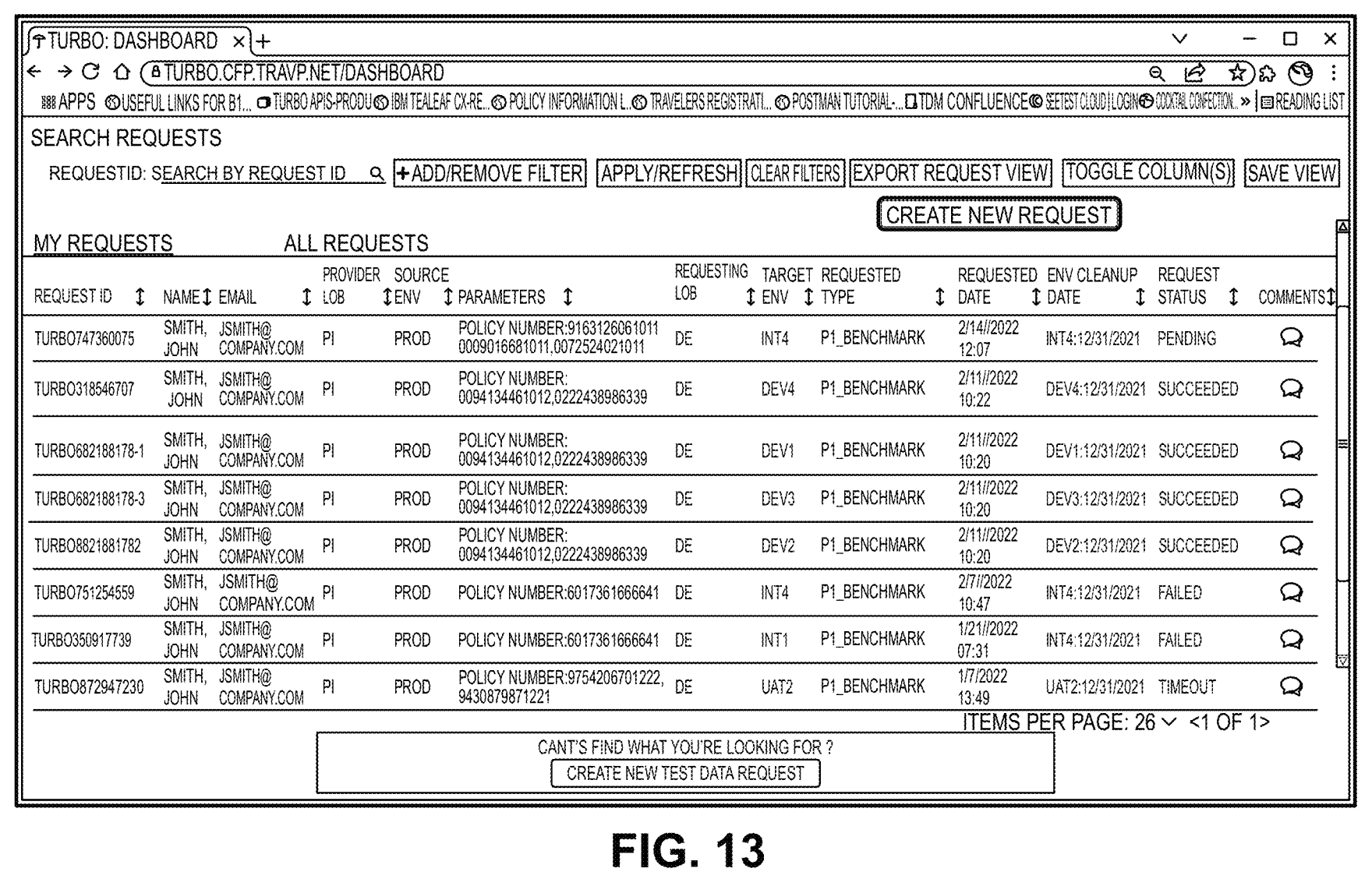

TURBO: DASHBOARD × +

← → C ⌂ 🔒 TURBO.CFP.TRAVP.NET/DASHBOARD    ♡ ⬆ ☆ 🌐

::: APPS ⊚ USEFUL LINKS FOR B1... ⬜ TURBO APIS-PRODU ⊚ IBM TEALEAF CX.RE... ⊚ POLICY INFORMATION L... ⊚ TRAVELERS REGISTRATI... ⊚ POSTMAN TUTORIAL... ⬜ TDM CONFLUENCE ⊚ SET TEST CLOUD II LOGIN ⊕ CONTROL CORRECTION... » 📖 READING LIST

SEARCH REQUESTS

REQUEST ID: SEARCH BY REQUEST ID 🔍    [ + ADD/REMOVE FILTER ] [ APPLY/REFRESH ] [ CLEAR FILTERS ] [ EXPORT REQUEST VIEW ] [ TOGGLE COLUMN(S) ] [ SAVE VIEW ]

MY REQUESTS    ALL REQUESTS

[ CREATE NEW REQUEST ]

| REQUEST ID ↕ | NAME ↕ | EMAIL ↕ | PROVIDER LOB ↕ | SOURCE ENV ↕ | PARAMETERS ↕ | REQUESTING LOB ↕ | TARGET ENV ↕ | REQUESTED TYPE ↕ | REQUESTED DATE ↕ | ENV CLEANUP DATE ↕ | REQUEST STATUS ↕ | COMMENTS ↕ |
|---|---|---|---|---|---|---|---|---|---|---|---|---|
| TURBO074736075 | SMITH, JOHN | JSMITH@COMPANY.COM | PI | PROD | POLICY NUMBER:916312606101 0009016681011,0072524021011 | DE | INT4 | P1_BENCHMARK | 2/14/2022 12:07 | INT4:12/31/2021 | PENDING | Q |
| TURBO031854707 | SMITH, JOHN | JSMITH@COMPANY.COM | PI | PROD | POLICY NUMBER: 0094134461012,0222438986339 | DE | DEV4 | P1_BENCHMARK | 2/11/2022 10:22 | DEV4:12/31/2021 | SUCCEEDED | Q |
| TURBO682188178-1 | SMITH, JOHN | JSMITH@COMPANY.COM | PI | PROD | POLICY NUMBER: 0094134461012,0222438986339 | DE | DEV1 | P1_BENCHMARK | 2/11/2022 10:20 | DEV1:12/31/2021 | SUCCEEDED | Q |
| TURBO682188178-3 | SMITH, JOHN | JSMITH@COMPANY.COM | PI | PROD | POLICY NUMBER: 0094134461012,0222438986339 | DE | DEV3 | P1_BENCHMARK | 2/11/2022 10:20 | DEV3:12/31/2021 | SUCCEEDED | Q |
| TURBO882188782 | SMITH, JOHN | JSMITH@COMPANY.COM | PI | PROD | POLICY NUMBER: 0094134461012,0222438986339 | DE | DEV2 | P1_BENCHMARK | 2/11/2022 10:20 | DEV2:12/31/2021 | SUCCEEDED | Q |
| TURBO751254559 | SMITH, JOHN | JSMITH@COMPANY.COM | PI | PROD | POLICY NUMBER:6017361666641 | DE | INT4 | P1_BENCHMARK | 2/7/2022 10:47 | INT4:12/31/2021 | FAILED | Q |
| TURBO350917739 | SMITH, JOHN | JSMITH@COMPANY.COM | PI | PROD | POLICY NUMBER:6017361666641 | DE | INT1 | P1_BENCHMARK | 1/21/2022 07:31 | INT4:12/31/2021 | FAILED | Q |
| TURBO872947230 | SMITH, JOHN | JSMITH@COMPANY.COM | PI | PROD | POLICY NUMBER:9754206701222, 9430879871221 | DE | UAT2 | P1_BENCHMARK | 1/7/2022 13:49 | UAT2:12/31/2021 | TIMEOUT | Q |

CANT'S FIND WHAT YOU'RE LOOKING FOR ?
[ CREATE NEW TEST DATA REQUEST ]

ITEMS PER PAGE: 26 ∨    <1 OF 1>

FIG. 13

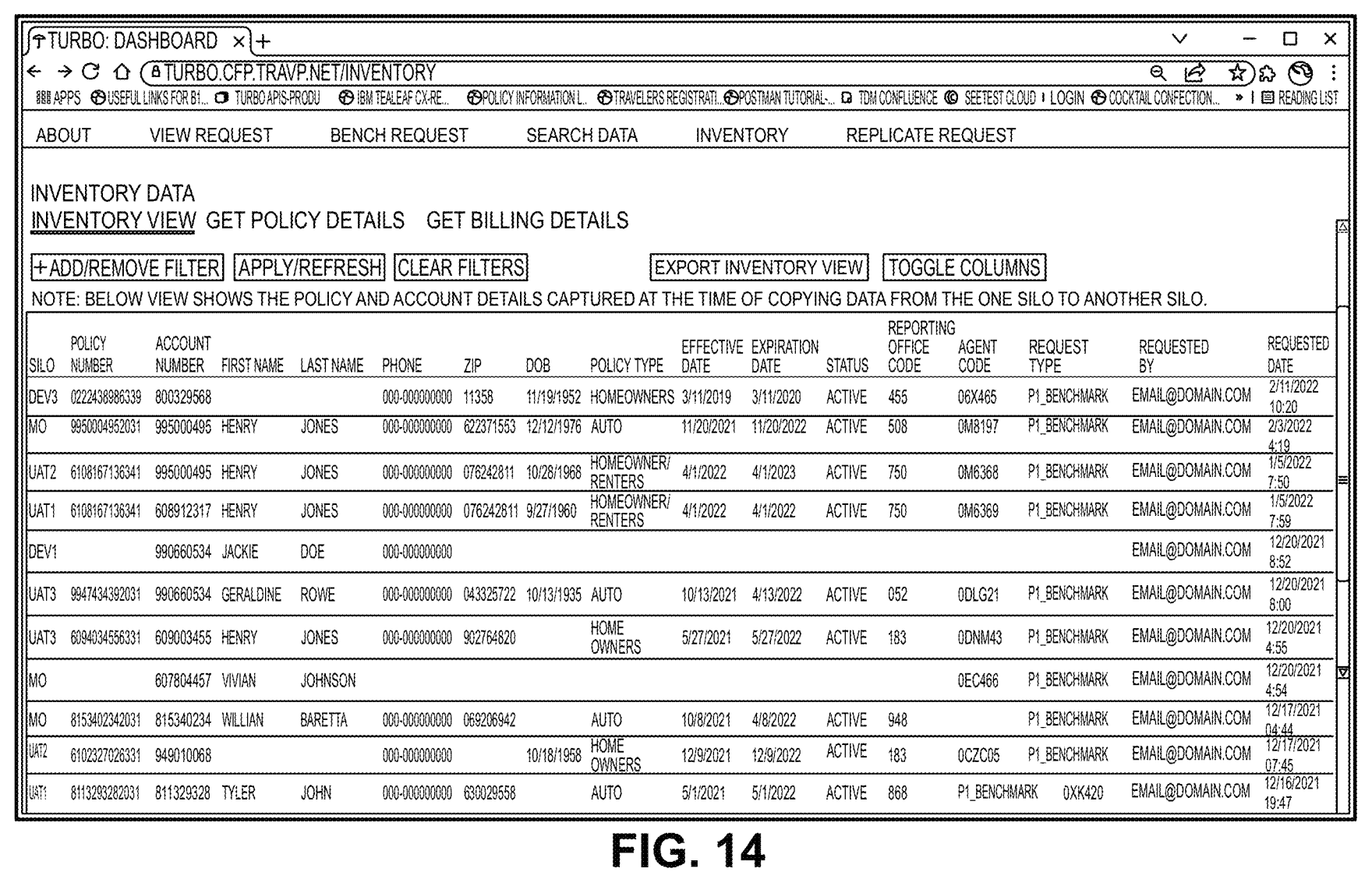

TURBO: DASHBOARD × +

← → C ⟳  ⓐ TURBO.CFP.TRAVP.NET/INVENTORY

888 APPS ⊕ USEFUL LINKS FOR BI... ▯ TURBO.APIS-PRODU... ⊕ IBM TEALEAF CX.RE... ⊕ POLICY INFORMATION L... ⊕ TRAVELERS REGISTRATI... ⊕ POSTMAN TUTORIAL... ▯ TDM CONFLUENCE ⊚ SEETEST CLOUD ▸ LOGIN ⊕ COCKTAIL CONFECTION... » ▯ ▤ READING LIST

ABOUT    VIEW REQUEST    BENCH REQUEST    SEARCH DATA    INVENTORY    REPLICATE REQUEST

INVENTORY DATA
INVENTORY VIEW   GET POLICY DETAILS   GET BILLING DETAILS
+ADD/REMOVE FILTER   APPLY/REFRESH   CLEAR FILTERS   EXPORT INVENTORY VIEW   TOGGLE COLUMNS
NOTE: BELOW VIEW SHOWS THE POLICY AND ACCOUNT DETAILS CAPTURED AT THE TIME OF COPYING DATA FROM THE ONE SILO TO ANOTHER SILO.

| SILO | POLICY NUMBER | ACCOUNT NUMBER | FIRST NAME | LAST NAME | PHONE | ZIP | DOB | POLICY TYPE | EFFECTIVE DATE | EXPIRATION DATE | STATUS | REPORTING OFFICE CODE | AGENT CODE | REQUEST TYPE | REQUESTED BY | REQUESTED DATE |
|---|---|---|---|---|---|---|---|---|---|---|---|---|---|---|---|---|
| DEV3 | 022438896339 | 800329568 | | | 000-000000000 | 11358 | 11/19/1952 | HOMEOWNERS | 3/11/2019 | 3/11/2020 | ACTIVE | 455 | 06X465 | P1_BENCHMARK | EMAIL@DOMAIN.COM | 2/11/2022 10:20 |
| MO | 985000495203I | 985000495 | HENRY | JONES | 000-000000000 | 622371553 | 12/12/1976 | AUTO | 11/20/2021 | 11/20/2022 | ACTIVE | 508 | 0M8197 | P1_BENCHMARK | EMAIL@DOMAIN.COM | 2/3/2022 4:19 |
| UAT2 | 610816713634I | 985000495 | HENRY | JONES | 000-000000000 | 076242811 | 10/28/1968 | HOMEOWNER/RENTERS | 4/1/2022 | 4/1/2023 | ACTIVE | 750 | 0M6368 | P1_BENCHMARK | EMAIL@DOMAIN.COM | 1/5/2022 7:50 |
| UAT1 | 610816713634I | 608912317 | HENRY | JONES | 000-000000000 | 076242811 | 9/27/1960 | HOMEOWNER/RENTERS | 4/1/2022 | 4/1/2022 | ACTIVE | 750 | 0M6369 | P1_BENCHMARK | EMAIL@DOMAIN.COM | 1/5/2022 7:59 |
| DEV1 | | 990660634 | JACKIE | DOE | 000-000000000 | | | | | | | | | | EMAIL@DOMAIN.COM | 12/20/2021 8:52 |
| UAT3 | 994743439203I | 990660634 | GERALDINE | ROWE | 000-000000000 | 043325722 | 10/13/1935 | AUTO | 10/13/2021 | 4/13/2022 | ACTIVE | 052 | 0DLG21 | P1_BENCHMARK | EMAIL@DOMAIN.COM | 12/20/2021 8:00 |
| UAT3 | 609403455633I | 609003455 | HENRY | JONES | 000-000000000 | 982764820 | | HOME OWNERS | 5/27/2021 | 5/27/2022 | ACTIVE | 183 | 0DNM43 | P1_BENCHMARK | EMAIL@DOMAIN.COM | 12/20/2021 4:55 |
| MO | | 607804457 | VIVIAN | JOHNSON | | | | | | | | | 0EC466 | P1_BENCHMARK | EMAIL@DOMAIN.COM | 12/20/2021 4:54 |
| MO | 815340234203I | 815340234 | WILLIAM | BARETTA | 000-000000000 | 069209942 | | AUTO | 10/8/2021 | 4/8/2022 | ACTIVE | 948 | | P1_BENCHMARK | EMAIL@DOMAIN.COM | 12/17/2021 04:44 |
| UAT2 | 610232702633I | 949010068 | | | 000-000000000 | | 10/18/1958 | HOME OWNERS | 12/9/2021 | 12/9/2022 | ACTIVE | 183 | 0CZC05 | P1_BENCHMARK | EMAIL@DOMAIN.COM | 12/17/2021 07:45 |
| UAT1 | 811328282203I | 811328928 | TYLER | JOHN | 000-000000000 | 639829558 | | AUTO | 5/1/2021 | 5/1/2022 | ACTIVE | 868 | P1_BENCHMARK | 0XK420 | | EMAIL@DOMAIN.COM | 12/16/2021 19:47 |

FIG. 14

TEST DATA ACQUISITION FRAMEWORK

BACKGROUND

Currently, a wholistic application programming interface (API) does not exist by which any line of business (LOB) of an organization can request a set of data for software testing purposes from any other data domain or combinations of intersecting data domains. Although such an API would be very useful in various organizations, there are a number of limitations that make such an API technically difficult to implement. For example, multiple end points for requesting data would need to be understood by users in the various LOBs. For another example, as use of such an API grows among LOBs, at some point the API will become cumbersome to properly configure. Further, to add intelligence/orchestration to the API, API developers will need to have domain knowledge of the multiple LOBs. As a result, inner sourcing opportunities would be extremely limited. An effort to coordinate a project to develop the API across LOBs would be technically very challenging due at least to the intricacies of the different domains. In addition, as the APIs change over time, due to new features being added and other features being removed, the impact to established processes that use the APIs can be significant.

SUMMARY

Various embodiments described herein address one or more of these drawbacks and difficulties found with the current conventional techniques. In a first aspect of the embodiments, a method is provided for satisfying a request for test data. A computing system receives the request for test data from a user. Responsive to the computing system determining that the test data does not exist in an inventory database, a number of operations are performed. According to the operations, when at least one function application program interface exists for satisfying the request, the computing system routes the request to one or more appropriate processors executing one or more appropriate function application program interfaces to satisfy the request. The one or more appropriate processors execute the at least one function application program interface to satisfy the request. The computing system notifies the originator of the request that the request for the test data is successfully completed and the corresponding data inventory database is updated appropriately.

In a second aspect of the embodiments, a computing system is provided for satisfying a request for test data. The computing system includes a processor and a memory connected to the processor, wherein the memory includes instructions recorded therein that cause the computing system to perform operations. According to the operations, the request for test data is received. In response to determining that the test data does not exist in an inventory database, operations are performed. According to the operations, when at least one function application program interface exists for satisfying the request, the request is routed to one or more appropriate processors executing one or more appropriate application program interfaces to satisfy the request. The one or more appropriate processors execute the at least one function application program interface to satisfy the request. An originator of the request is notified that the request for the test data is successfully completed and the corresponding data inventory database is updated appropriately.

In a third aspect of the embodiments, a non-transitory computer-readable storage medium is provided that has instructions for a processor of a computing system recorded thereon for performing operations. According to the operations, a request for test data is received. In response to determining that the test data does not exist in an inventory database, operations are performed. According to the operations, when at least one function application program interface exists for satisfying the request, the request is routed to one or more appropriate processors executing one or more appropriate function application program interfaces to satisfy the request. The one or more appropriate processors execute the at least one function application program interface to satisfy the request. The originator of the request is notified that the request for the test data is successfully completed and the corresponding data inventory database is updated appropriately.

Various implementations of the methods, computing systems, and media described herein may use a plurality of function application program interfaces that are executed in series in a particular order or in parallel.

In various implementations of the methods, computing systems, and media described herein, the operations may include, responsive to determining that test data that satisfies the request exists in the inventory database and is not stale data, performing further operations including: obtaining the test data that satisfies the request from the inventory database; writing the obtained test data to a target destination; and notifying the user that the request succeeded after the writing is completed. In some such implementations, the operations may further include: responsive to the determining that the test data that satisfies the request exists in the inventory database and is stale data based on a type of the request, discarding the stale data.

In various implementations of the methods, computing systems, and media described herein, the operations performed in response to determining that the test data does not exist in an inventory database may further include: determining that an intercept is required to obtain additional data for the request; and obtaining the additional data to enrich the request.

In various implementations of the methods, computing systems, and media described herein, the operations may include, responsive to determining that at least one function application program interface to satisfy the request does not exist, transmitting a notification of the request to an expert, wherein the notification includes information regarding manually satisfying the request. In some such implementations, the operations may further comprise: in response to determining that at least one function application program interface to satisfy the request does not exist, adding one or more new function application program interfaces to satisfy the request.

In various implementations of the methods, computing systems, and media described herein, the operations may further include: storing test data that satisfies the request in the inventory database.

Combinations, (including multiple dependent combinations) of the above-described elements and those within the specification have been contemplated by the inventors and may be made, except where otherwise indicated or where contradictory.

BRIEF DESCRIPTION OF THE DRAWINGS

An understanding of various embodiments described in this disclosure and their advantages may be obtained by reference to the following detailed description when considering the accompanying drawings.

FIG. 9 shows an example view request display screen, which displays either information regarding a user's request or information regarding all users' requests, according to an embodiment.

FIG. 13 illustrates an example search request screen for displaying either all requests from a user or all requests from all users.

FIG. 14 shows an example inventory data screen that displays policy and account details that were captured when data was copied from one silo to another.

DETAILED DESCRIPTION

Currently, when a user desires to acquire a set of test data, the user requests a domain expert (e.g., a person familiar with the data) to manually obtain the set of test data. No record or copy of the obtained set of data is maintained, and as a result, other users also may make requests to the domain expert for the same set of test data. Consequently, a domain expert may unnecessarily perform duplicate tasks. Further, the user typically needs source and target domain knowledge in order to make a request and to provide all information needed for the request to the domain expert. For example, the user would need to know a source domain for acquiring data and a target domain for writing, e.g., benching, the acquired data.

This disclosure describes embodiments that solve such problems and other drawbacks of current conventional systems and techniques by providing a system, method, and non-transitory computer-readable medium for automatically obtaining a requested set of test data. According to embodiments, a user may not provide all the information needed for the request. For example, an intercept may determine additional information for the request and may automatically include that additional information in the request. Further, an inventory database may be maintained to store data related to results of requests. If the inventory database indicates that data satisfying a request had already been acquired and stored and the data include non-stale data (e.g., a set of test data that is not older than a specific threshold amount of time, such as not more than 30 days old), then a requester may be informed about the data. Thus, searching for and acquiring the test data in a source environment may be avoided if the request can be satisfied by data that has already been acquired and stored in a target environment. This reduces the amount of computing resources used, reduces processing time, and reduces the usage of network communication bandwidth.

If the non-stale test data is not included in the inventory database, then the system, method, and non-transitory computer-readable medium may automatically cause the requested set of data to be obtained from a requested source environment and benched to, e.g., written to, a requested target environment. Thus, the user making the request may have no domain knowledge of either the source or target environment, in contrast to current conventional systems and techniques. Any needed information not provided by a user when making a request for a set of test data may be obtained and provided by the various embodiments.

Figure 1:
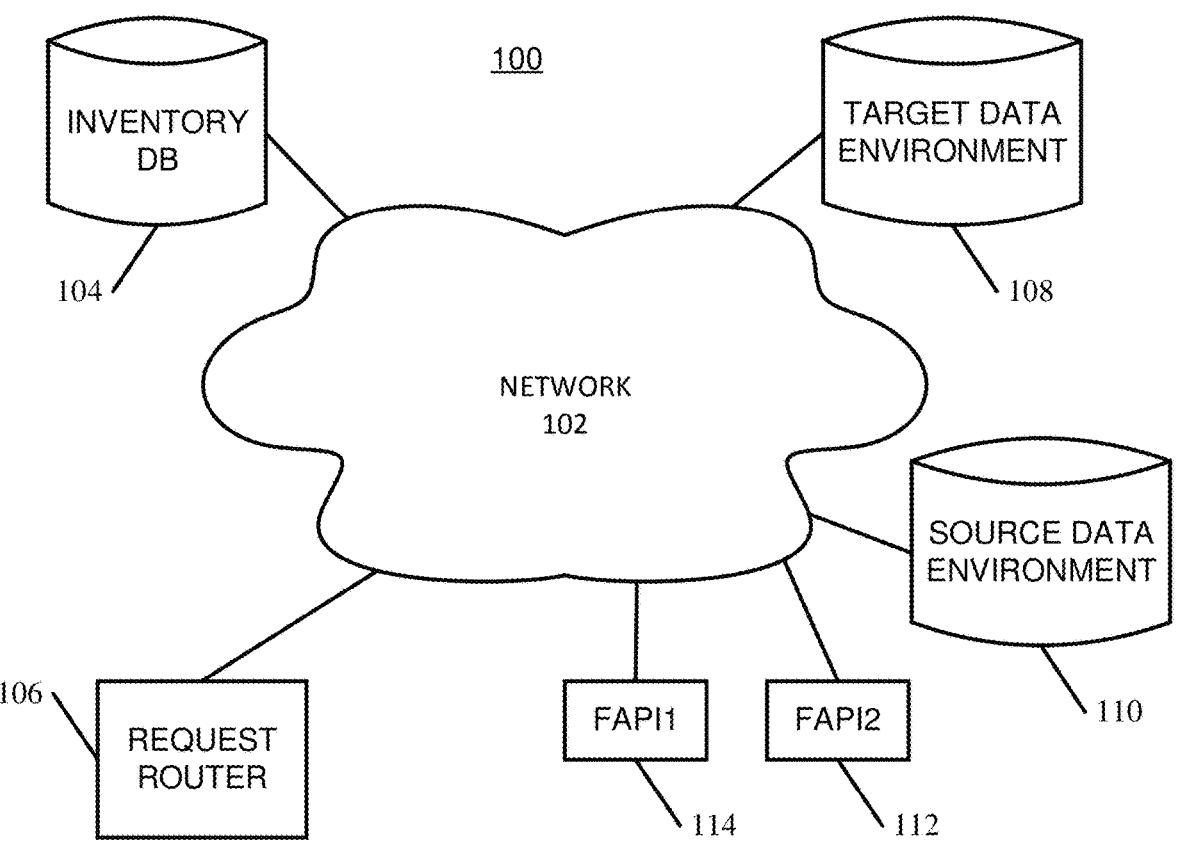
FIG. 1 shows an example environment in which embodiments may be implemented.

FIG. 1 illustrates an example environment 100 in which embodiments may be implemented. Environment 100 may include a network 102, an inventory database 104, a request router 106, a target data environment 108, a source data environment 110, a first function application program interface (FAPI1) 114, and a second function application program interface (FAPI2) 112. When executed, the FAPIs may acquire, e.g., copy, the requested test data from source data environment 110 and may store the test data in target data environment 108. Using an example from the insurance industry, a FAPI may acquire policy data regarding policies specified in a request and may bench (e.g., write or store), the policy data to target data environment 108.

Network 102 may be implemented by any number of any suitable communications media (e.g., wide area network (WAN), local area network (LAN), Internet, Intranet, etc.) or a combination of any of the suitable communications media. Network 102 may further include wired and/or wireless networks.

FAPI1 114 and FAPI2 112 may execute in the same computing device or two different computing devices (not shown), which may include one or more of a server, a desktop computer, a laptop computer, a smartphone, a tablet computer, or other type of computing device, and may be connected to network 102 via a wired or wireless connection.

Inventory database 104 may include a database management system and its contents. In some embodiments, the database management system may comprise a relational database management system such as, for example, SQL, or another database management system. In some embodiments, inventory database 104 may be directly connected or implemented with a server (not shown).

Request router 106 may receive user requests for sets of test data and may route the requests to appropriate FAPIs, executing on one or more processors, to satisfy the requests. In some embodiments, request router 106 may be implemented by a server, or the like.

Target data environment 108 and source data environment 110, respectively, are the data environment in which a set of test data is to be written, and the data environment from which the set of test data is to be acquired.

Although FIG. 1 shows environment 100 including only one target data environment 108, one source data environment 110, and two function application program interfaces (FAPIs) 112, 114, in other embodiments, environment 100 may include more than one target data environment 108, more than one source data environment 110, fewer than two FAPIs, or more than two FAPIs. Further, in some embodiments, environment 100 may comprise a cloud environment.

Figure 2:
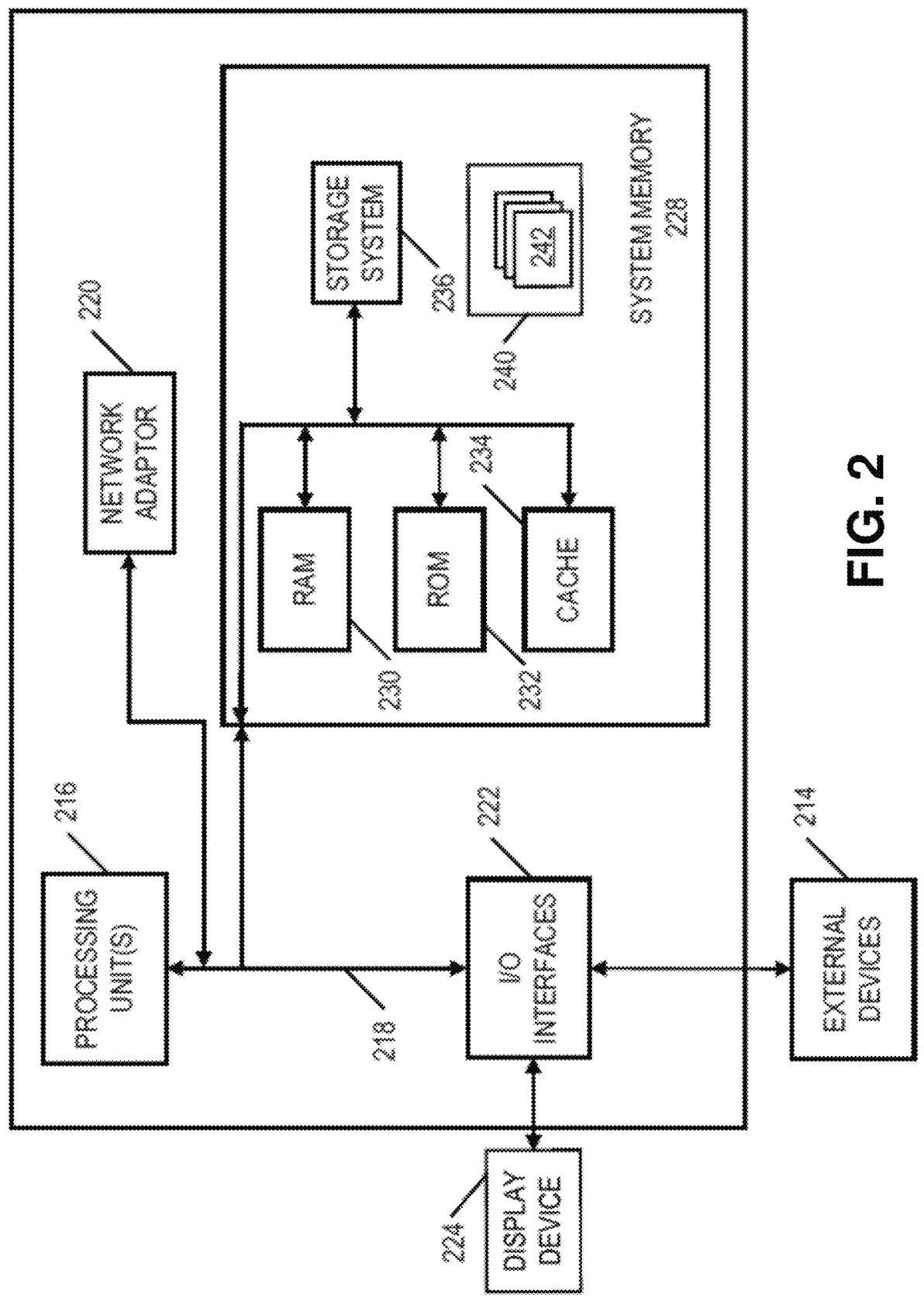
FIG. 2 is a block diagram of a computing system that may implement any of one or more computing devices that further execute one or more function application program interfaces (APIs), a request router, a server to which an inventory database may be connected, and one or more servers in which a target data environment may reside, according to embodiments.

FIG. 2 illustrates an example computing system 200, which may implement any of: one or more computing devices executing FAPI1 114 and FAPI2 112, a request router 106, a server with which inventory database 104 may be connected or implemented, or one or more servers in which target data environment 108 or source data environment 110 may reside.

Computing system 200 is shown in the form of a general-purpose computing device. Components of computing system 200 may include, but are not limited to, one or more processing units (processors) 216, a system memory 228, and a bus 218 that couples various system components including system memory 228 to the processing units 216.

Bus 218 represents any one or more of several bus structure types, including a memory bus or memory controller, a peripheral bus, an accelerated graphics port, and a processor or local bus using any of a variety of bus architectures. Such architectures may include, but not be limited to, Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computing system 200 may include various non-transitory computer-readable media, which may comprise any available non-transitory media accessible by computing system 200. The computer-readable media may include volatile and non-volatile non-transitory media as well as removable and non-removable non-transitory media.

System memory 228 may include non-transitory volatile memory, such as random access memory (RAM) 230 and cache memory 234. System memory 228 also may include non-transitory non-volatile memory including, but not limited to, read-only memory (ROM) 232 and storage system 236. Storage system 236 may be provided for reading from and writing to a nonremovable, non-volatile magnetic medium, which may include a hard drive or a Secure Digital (SD) card. In addition, a magnetic disk drive, not shown, may be provided for reading from and writing to a removable, non-volatile magnetic disk such as, for example, a floppy disk, and an optical disk drive (not shown) may be provided for reading from or writing to a removable non-volatile optical disk such as a CD-ROM, DVD-ROM or other optical media. Each memory device may be connected to bus 218 by at least one data media interface. System memory 228 further may include instructions for processing unit(s) 216 to configure computing system 200 to perform the functions, acts, and/or operations of the embodiments described herein. For example, system memory 228 also may include, but is not limited to, processor instructions for an operating system, at least one application program, other program modules, program data, and an implementation of a networking environment.

Program/utility 240, having a set (at least one) of program modules 242, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the invention as described herein.

Computing system 200 may communicate with one or more external devices 214 including, but not limited to, one or more displays, a keyboard, a pointing device, a speaker, at least one device that enables a user to interact with computing system 200, and any devices including, but not limited to, a network card, a modem, etc., that enable computing system 200 to communicate with one or more other computing devices. The communication can occur via Input/Output (I/O) interfaces 222. Computing system 200 can communicate with one or more networks including, but not limited to, a local area network (LAN), a general wide area network (WAN), a packet-switched data network (PSDN) and/or a public network such as, for example, the Internet, via network adapter 220. As depicted, network adapter 220 communicates with the other components of computer system 200 via bus 218.

It should be understood that, although not shown, other hardware and/or software components could be used in conjunction with computer system 200. Examples, include, but are not limited to, microcode, device drivers, redundant processing units, external disk drive arrays, redundant array of independent disks (RAID) systems, tape drives, and data archival storage systems, etc.

Figure 3:
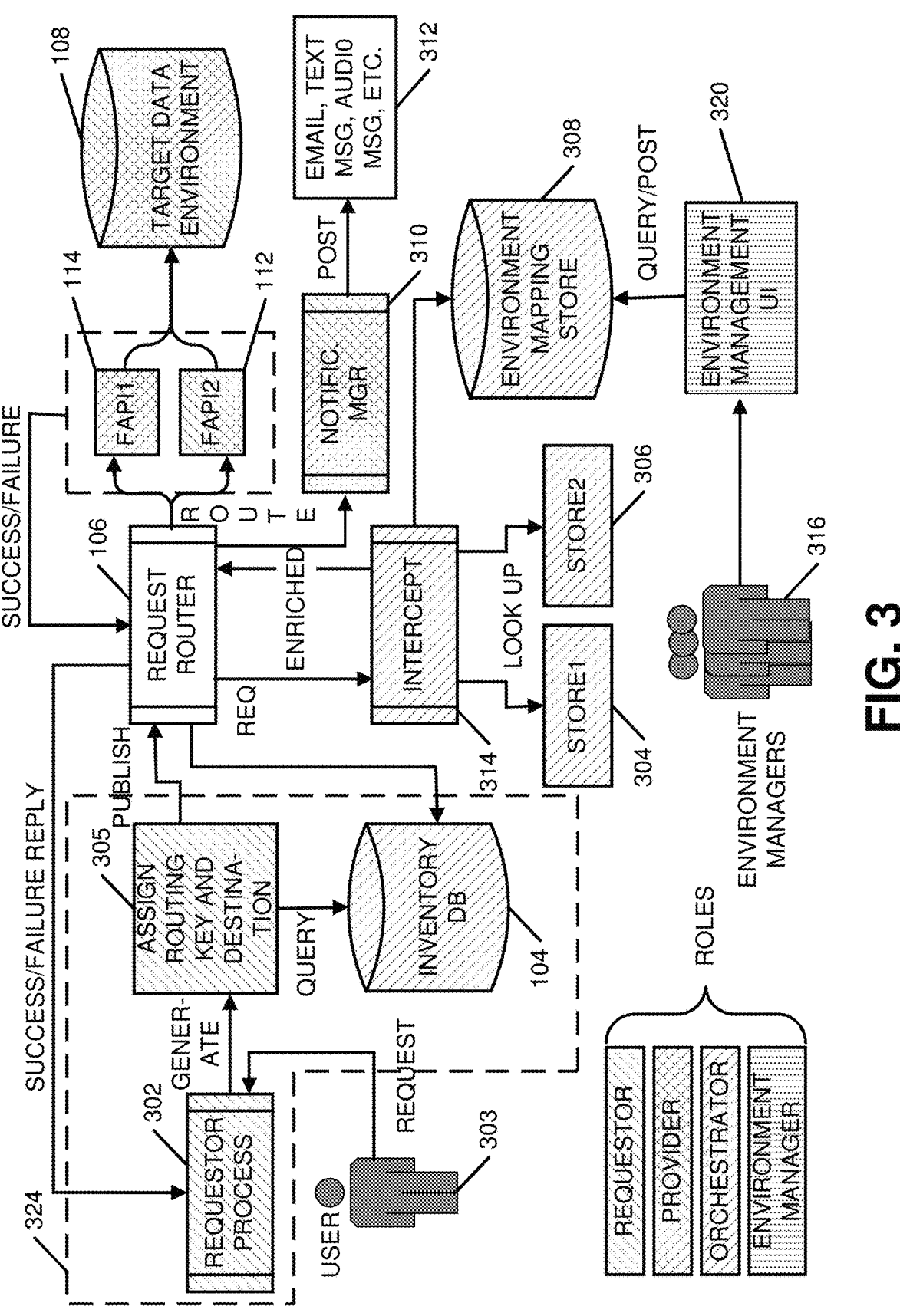
FIG. 3 shows an example architecture of a test data acquisition framework, according to embodiments.

FIG. 3 illustrates an architecture of an example test data acquisition framework (TDAF). As shown at the bottom left in FIG. 3, the functions, processes, and parts may be classified into four roles: requestor, provider, orchestrator, and environment manager. In general, the requestor portion of the architecture shown in FIG. 3 (e.g., 302, 305) interfaces with a user 303 to process and direct requests for test data from the user 303, and to notify the user 303 regarding the results of the request. In some examples, the user (e.g., requestor) 303 may be a software developer or software tester who wishes to perform tests on a newly developed system, software application, or the like, using realistic test data (e.g., operational data). In other examples, the "user" or requestor 303 may comprise another computing system (e.g., a processor-based device) that is programmed to request test data, for example, periodically for manual or automated testing of a new system, software application, or the like. According to some embodiments, requestor process 302, block 305, and inventory database 104 comprise a rule processing layer 324, shown in FIG. 3, that accepts requests from a user and intelligently routes them to the appropriate intercepts and FAPIs to bench data to the appropriate target data environment 108.

In general, the provider portion of the architecture shown in FIG. 3 (e.g., 108, 112, 114, 310) may implement requests for test data submitted by a requestor (e.g., user 303), which may include acquiring data from source data environment 110 (shown in FIG. 1), storing or copying the acquired data into the target environment 108, and notifying the requestor (e.g., 303) regarding the results of the request.

In general, the orchestrator portion of the architecture shown in FIG. 3 (e.g., 104, 304, 306, 308, 314) may determine that a request submitted by the requestor (e.g. 303) should be enhanced before the provider portion implements it. In various implementations, the orchestrator portion may enhance the request by applying data enrichment, data transformation, and/or delivery orchestration to the request, e.g., via a low/no code process. In some implementations, data enrichment may include adding data to the request transparently with respect to the user 303. In the example shown in FIG. 3, the orchestrator portion includes the inventory database 104, which may store test data or data associated with the test data that was acquired from the source data environment 110, shown in FIG. 1.

In general, the environment manager portion of the architecture shown in FIG. 3 (e.g., 320, 316) may keep track of what environments line up with other environments across LOBs and may provide mappings of environments, which may be stored in an environment mapping store 308. For example, LOB1.DEV environment may line up with TargetLOB.Silo1 environment such that data from the LOB1.DEV environment may be stored in the TargetLOB1.Silo1 environment.

Various embodiments consistent with the TDAF shown in the example of FIG. 3 may employ an Event Driven Architecture (EDA), as opposed to a point-to-point integration, to perform requested test data movements. In such embodiments, the event driven architecture uses events to trigger actions and communications between decoupled services. An EDA creates, detects, consumes, and reacts to events. Examples of events in various embodiments may include receiving of a request, publishing of the request, and routing of the request to a FAPI, among other things.

For example, consider the use case where a user 303, which may be a test engineer, a software developer, or a separate application program, submits, sends, or otherwise provides a request for data (e.g., operational data from a source data environment 110) to the system shown in FIG. 3. The system may process the request by first assigning it a routing key, at block 305, based on a type of request being made, and a destination. According to some embodiments, the routing key may have a format such as etdaf.sourcelob.targetlob.requestkey.scope, where etdaf is an identifier of a particular test data acquisition framework, and sourcelob and targetlob are LOBs related to a source and a target, respectively. Requestkey is a primary target operation such as, for example, get a certain type of data from a source data environment. Scope may be optional information that can be added to a request for target use to further tune the request such as, for example, "version 3". In an example, the routing key may comprise an eventDomain, an eventLob, an eventType, an eventAction, and an eventScope, according to an agreed upon naming convention.

After the assignment of a routing key, the test data request (e.g., data movement or copying request) may be published (e.g., sent) to a single test data management (TDM) Event API, which is represented by the request router 106 in the example of FIG. 3. In various implementations, the published message payload (e.g., content of a request) adheres to a specific TDM data request schema enforced by the TDM Event API. The TDM Event API expects requests to have certain parameters in a specific order. If the certain parameters are not provided or are provided, but are not in the specific order, then the TDM Event API may not accept the TDM data request and may generate and return an error indication to an originating requestor process 302 or an originating requesting user 303.

Request router 106 may publish a request, including a routing key. FAPIs such as FAPI1 114 and FAPI2 112 may each listen for requests having one or more routing keys specific to those APIs. Upon receiving a request with one of the one or more specific routing keys, the corresponding FAPI, or provider, processes the request and publishes a response to request router 106 indicating success or failure of the request. Request router 106 may publish the response to the originating requester process 302 or the originating user 303.

Continuing with the use case example, after the provider (e.g., FAPI1 114 or FAPI2 112) gathers the data specified by the request from the source data environment 110, the provider (e.g., 114) sends a "success" reply to the requestor (e.g., to user 303 or requestor process 302). In general, providers (e.g., 112, 114) can publish a success or failure reply or response back to listeners (e.g., user/requestor 303) via the EDA (e.g., via the request router 106 and the requestor process 302, in the example of FIG. 3). A success indicates that the specific task or tasks have been successfully carried out (e.g., that the requested data was acquired and benched, e.g., written to, the target data environment 108), while a failure indicates that the specific task or tasks have not been successfully carried out. The requestor processes 302 can listen for and receive responses from providers as requests are processed.

In various embodiments, each request may include a target data process, data acquisition query parameters, and a target environment. The target data process may include a routing key that targets a specific or composite request LOB type that has been published by a provider entity. The data acquisition query parameters may include data requirements of test data that a requestor desires to acquire. In an insurance industry example, the data requirements may include one or more claim numbers, policy numbers, and account numbers that a requestor desires to acquire. In other embodiments, the data requirements may include other attribute values of test data that a requestor desires to acquire. The target environment is where the requested data is to be delivered or copied.

The use case example presented with respect to FIG. 3 describes a data request that the system completes successfully using a pre-existing FAPI (e.g., 114) that is capable of fulfilling the request. Other aspects and components of FIG. 3 are described below with respect to FIGS. 4A-4B and 5; for example, checking whether the requested data or data associated with the requested data is in the inventory database 104, the notification manager 310 notifying an expert when there is no pre-existing FAPI to satisfy the request, the intercept block 314 performing a request intercept to obtain additional information related to the request, or the like.

One of ordinary skill will recognize that although various embodiments described herein use a publish-subscribe messaging model, other embodiments may use different communications models without departing from the principles of the invention.

Figure 4A:
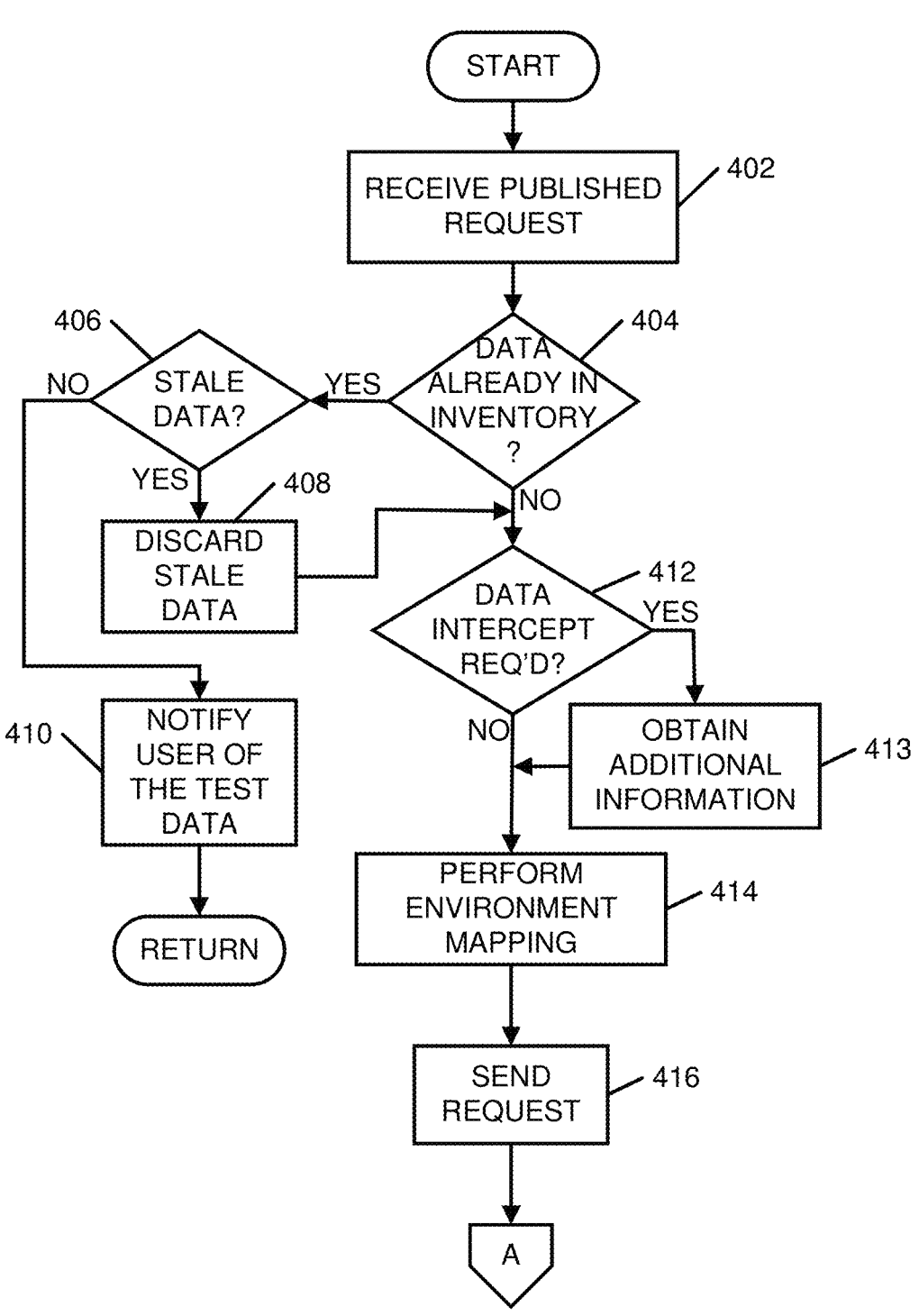
FIGS. 4A-4B illustrate a flowchart of an example process for receiving and processing a request for test data, according to embodiments.
Figure 4B:
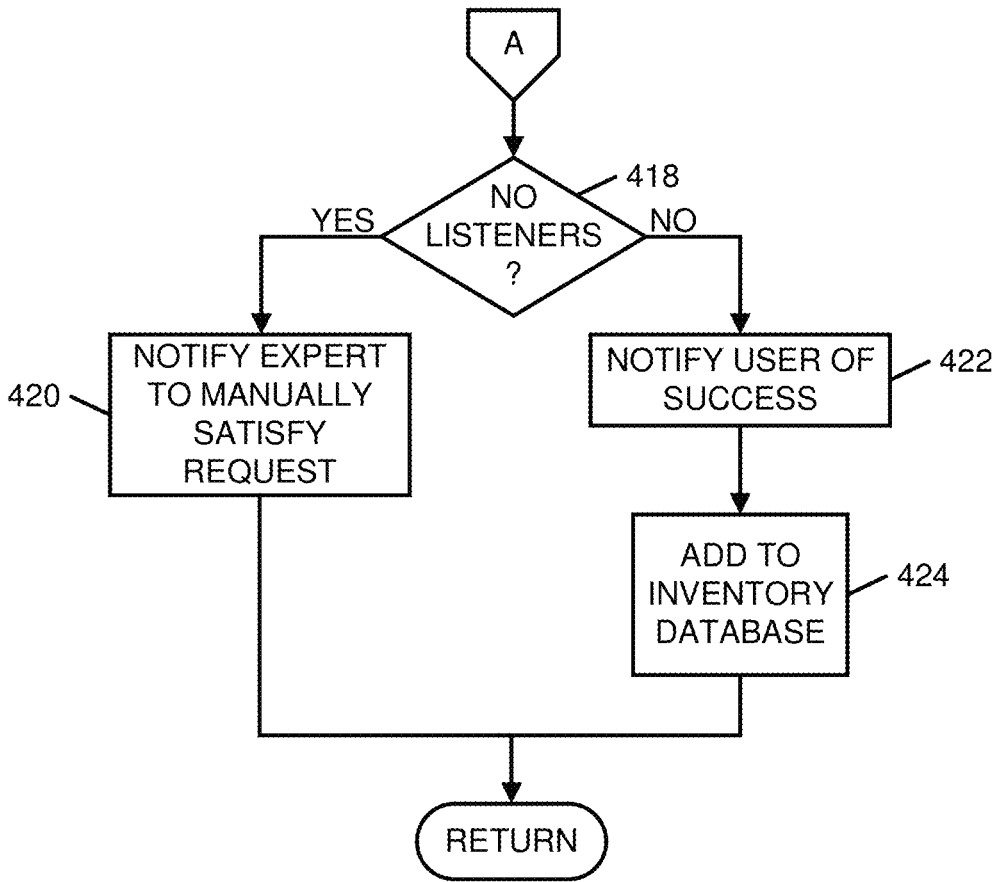

FIGS. 4A-4B show a flowchart of an example process by which a request for test data may be received and processed. In various embodiments, the process of FIGS. 4A-4B may be implemented using environment 100 of FIG. 1, computing system 200 of FIG. 2, and/or the architecture of FIG. 3. The process may begin with a request router 106 receiving a request for test data, which in some embodiments may be published to a single test data management (TDM) Event API, to copy a set of test data from a source data environment 110 to a target data environment 108 (act 402). The published message payload of the request adheres to a specific TDM data request schema enforced by the TDM Event API. The request may have been generated by a requestor process 302 or may have been created by a user 303 and may include a data source LOB, a target LOB, a target data silo, or target data environment location, and various request-specific data including, but not limited to, a claim number, a date range, and a policy type.

Next, the process may determine whether a set of data that satisfies the request and/or data associated with the data that satisfies the request (e.g., metadata) exists in inventory database 104 (act 404). If the set of data is determined to exist in inventory database 104, (404, yes), then a determination may be made regarding whether the set of data in the inventory database is stale (act 406). In various embodiments, the process may determine that the set of data is stale if the set is older than a threshold time period, such as, if the set is more than two days old, more than seven days old, more than 14 days old, more than 30 days old, or the like. This determination (e.g., via the threshold time period) may vary depending on the source LOB and/or the target LOB. In some cases, the threshold time period may come from the source or may be derived from historical data. In other cases, a user may determine an age of items at the source and then may decide whether to use or discard the items based on their age.

If the set of data is determined to be stale (406, yes), then the stale set of data may be discarded (e.g., deleted from the inventory database) (act 408) and processing may continue at act 412. Otherwise, if the set of data is determined to not be stale (406, no), then the requesting user 303 may be notified that the set of test data is already in the inventory database 104 (act 410). The notification may be made via email, text message, automated telephone call, a display, the user interface of an application, or via another method.

If, during act 404, the requested set of data and/or data associated with the requested set of data (e.g., metadata) are determined not to exist in inventory database 104, (404, no), or after discarding a stale set of data during act 408, request router 106 may determine whether the request should be enriched with additional information by performing a data intercept (act 412). If so, then an intercept 314 may be performed to obtain additional information from one or more data stores (e.g., store1 304 or store2 306) to enrich the request, based on information included in a payload of the request. The information, which is correlated to the current request, is dynamically looked up and expected by one or more FAPIs 112, 114 used to fulfill the request (act 413). In other embodiments, different or other data stores may be available for dynamically looking up information. In yet other embodiments, fewer or more data stores may be available for dynamically looking up information.

Source to target environment mapping may be performed for most, but not necessarily all, requests. This mapping may be performed by the intercept module 314 accessing the environment mapping store 308, which may be maintained by various LOB environment managers 316 (act 414). Then the request router 106 may send the request along with a routing key (act 416). One or more FAPIs 112, 114 that are listening for requests with that routing key may process and satisfy the request.

If no FAPI processes the request within a predetermined time period, a timeout occurs (418, yes) (FIG. 4B) and an expert may be notified to manually satisfy the request (act 420). The notification may be provided to notification manager 310, which posts the notification to any of an email, a text message, an audio message, an automated phone call, etc. 312. The notification may be delivered to an appropriate domain expert to inform the domain expert to manually satisfy the request (i.e., to manually provide the requested test data). After receiving the notification, the appropriate domain expert may manually satisfy the request and the user may be notified that the request was successfully satisfied.

If one or more FAPIs processes the request within a predetermined time period (e.g., there are one or more listening FAPIs that will process the request with that routing key), then the request has been successfully processed and a process 302 or user 303 who originated the request may be notified that the request was successfully processed (act 422). The notification may be provided via email, text message, an audio message, an automated telephone call, an application interface, or via other methods.

Following act 422, data obtained as a result of the request is written to the target data environment 108, and the data obtained as a result of the request, and/or data associated with the obtained data (e.g., metadata), may be stored to the inventory database 104 (act 424).

In some embodiments, FAPIs may be executed in series in a particular order. This feature can be useful for creating a chain of function application program interfaces in which, for example, an output of one function application program interface may be input to a next function application program interface, or separately acquired test data from different sources may be acquired and merged for test purposes. As another example, some FAPIs may be created to perform basic functions such as obtain data from a source environment and store the obtained data in a target environment. These basic functions can be chained together to create a chain of function application program interfaces that together perform a more complex function such as combining in unique ways data obtained via processing by different FAPIs. As shown in an example of FIG. 5, after one FAPI acquires test data, a next function application program interface in the series may be notified to acquire other test data. An example of executing three function application program interfaces in series is illustrated by FIG. 5.

In some embodiments, a process that performs the data benching may be instructed to invoke a call back uniform resource locator (URL) to a receiving process to automate testing based on newly acquired data without human intervention. Requests can be chained such that a notification of completion of data bench process 1 may automatically invoke data bench process 2 with input from a result of data bench process 1.

Figure 5:
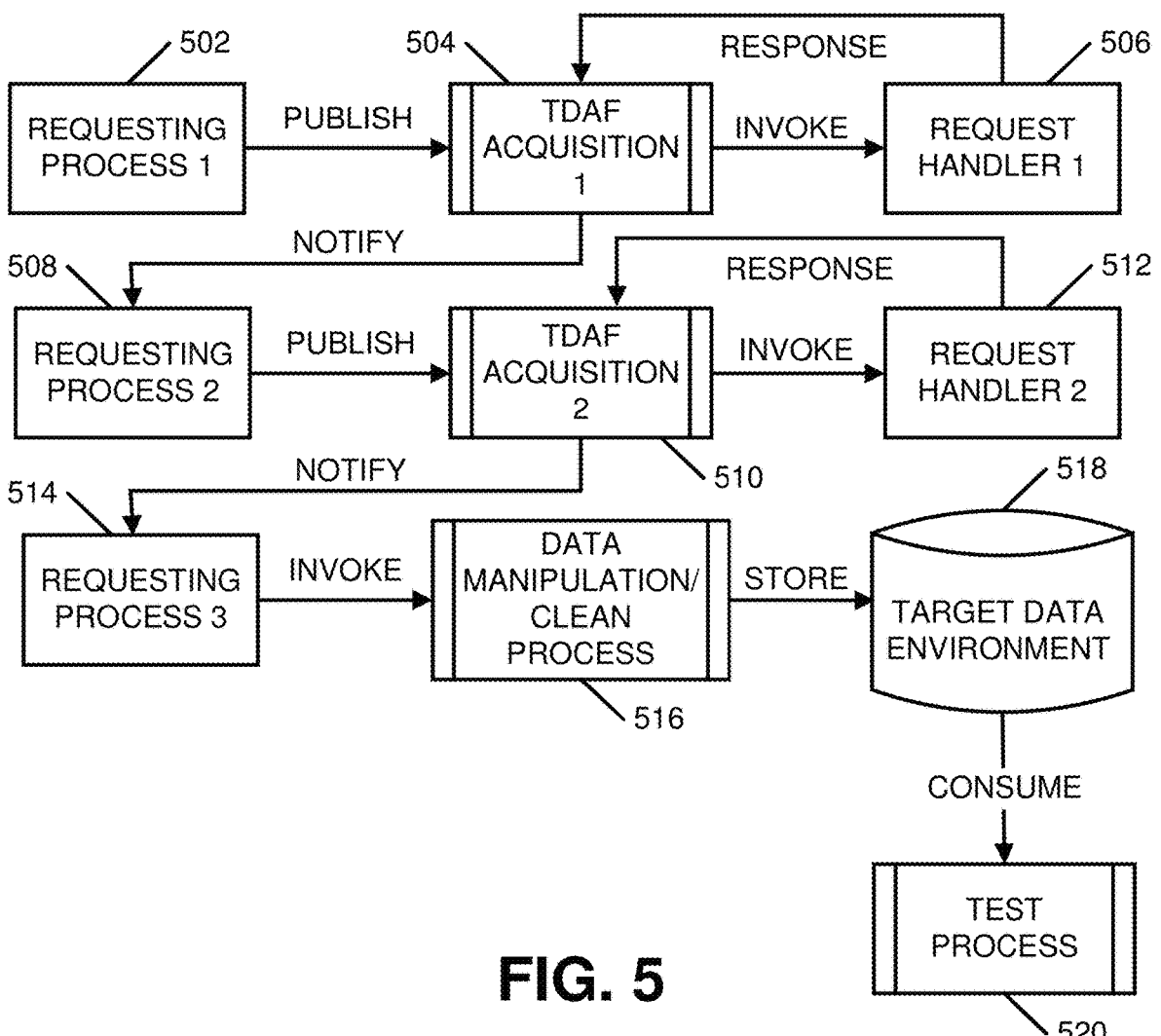
FIG. 5 shows an example of multiple function application program interfaces executing in sequence in a particular order, according to embodiments.

FIG. 5 shows requesting process 1 502 publishing or otherwise providing a request to request router 106 to acquire test data from a source environment and store the acquired test data to a target environment via test data acquisition framework (TDAF) acquisition 1 504 (FAPI1 114). Upon completion of acquiring and storing the test data, TDAF acquisition 1 504 (FAPI1 114) may send a notification to the rule processing layer 324 to invoke requesting process 2 508 to publish or otherwise provide a second request to request router 106 to acquire additional test data via TDAF acquisition 2 510 (FAPI2 112) and to invoke request handler 1 506, which will issue a response to TDAF acquisition 1 504 indicating that the invocation was successful. Upon completion of acquiring the additional test data, TDAF acquisition 2 510 (FAPI2 112) may send a notification to invoke requesting process 3 514 to publish or otherwise provide a request to request router 106 to invoke a data manipulation/clean process 516 to manipulate and clean the acquired test data and the acquired additional test data and to invoke request handler 2 512, which will issue a response to TDAF acquisition 2 indicating that the invocation of request handler 2 512 was successful. Upon completion of processing, data manipulation/clean process 516 may store a resulting test data product in target data environment 518 where it may be consumed by a test process/tool 520, which tests a body of code using mock or real test data such as, for example, the resulting test data product. Test process/tool 520 may comprise an executing automated test, or another tool in the testing process that organizes or consumes test data.

FIGS. 6-14 show examples of display screens with a graphical user interface (GUI) in an embodiment of the test data acquisition framework.

Figure 6:
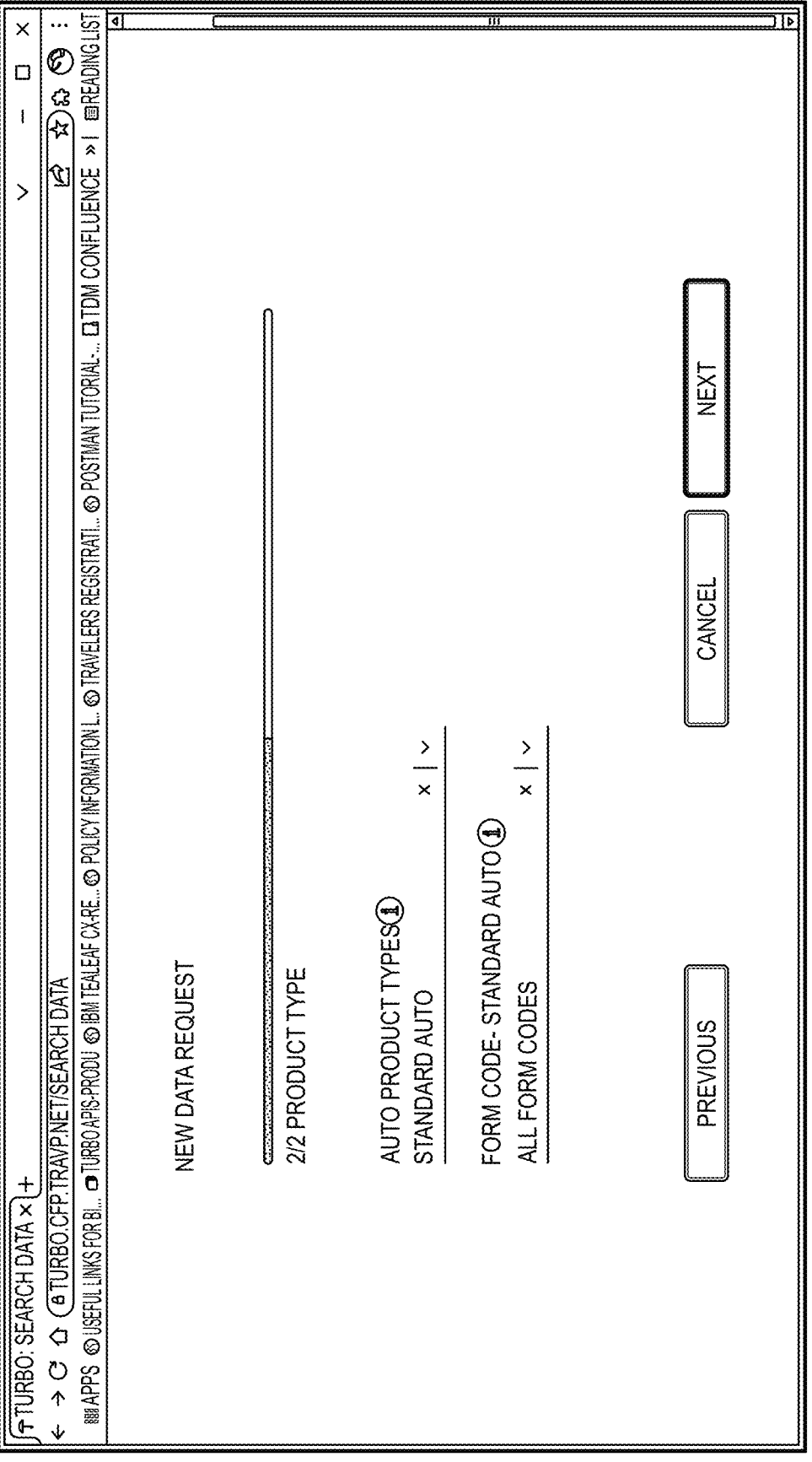
FIG. 6 shows a new data request display screen, according to embodiments.

FIG. 6 shows one possible implementation of a "new data request" display screen in the context of insurance information. In this example display screen, a user 303 is able to provide information about the desired type of insurance information, which the system will form into a data acquisition request (e.g., 402) by creating a request, which is assigned a routing key based on a type of request being made, and a destination, at 305, based on information provided via the new data request display screen. The created request then may be published, e.g., via request router 106, which may provide the request to one or more FAPIs listening for requests having a particular routing key. As shown in the display screen of FIG. 6, the user indicated an auto product type and a form code of "all form codes". Once the user provides the requested information via the display and selects "next", a summary of the new data request may be displayed.

Figure 7:
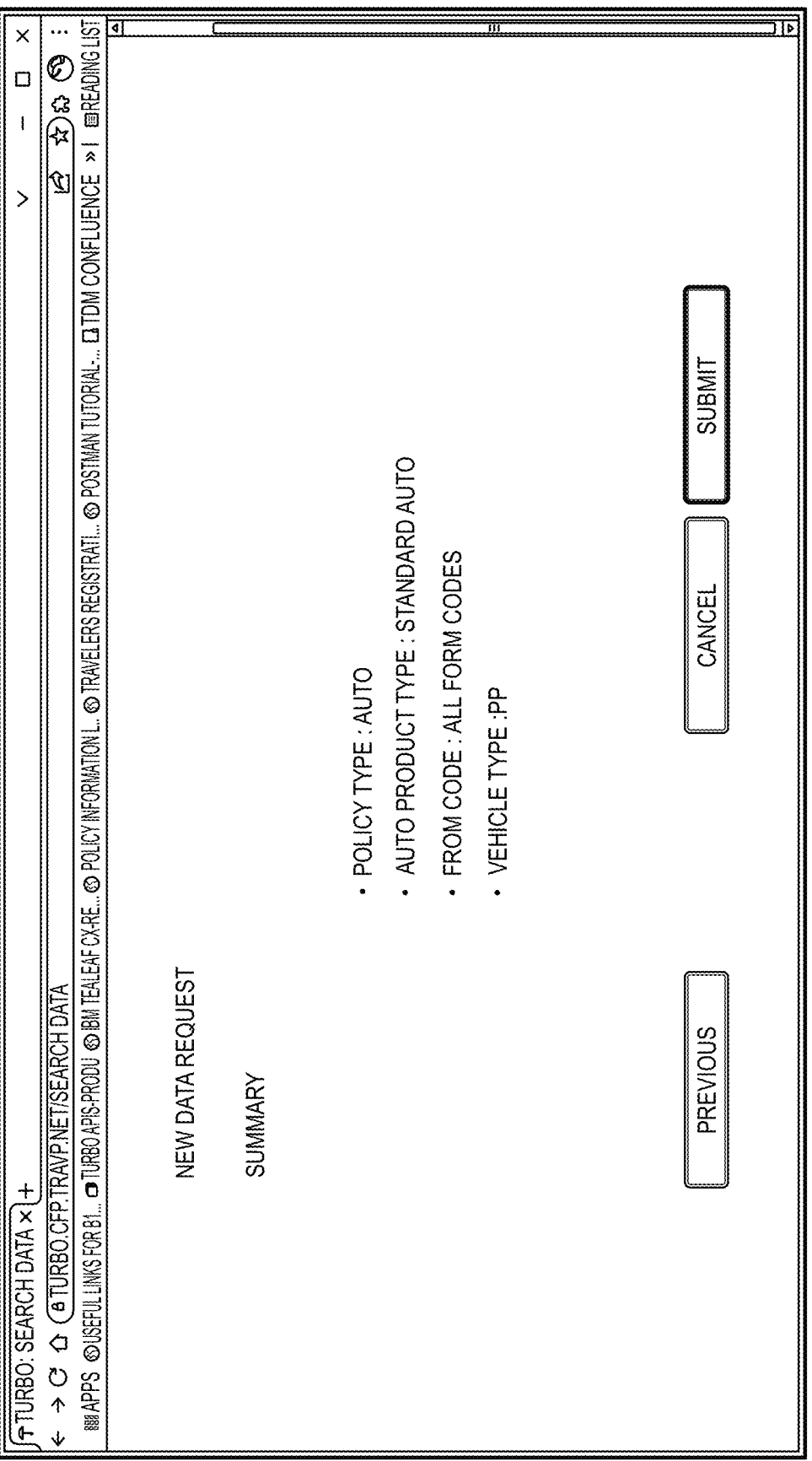
FIG. 7 illustrates a display screen showing an example summary for a new data request, according to embodiments.

FIG. 7 shows a summary for the submitted new data request of FIG. 6, which reflects the user-inputted information and predetermined information that is associated with the user-inputted information. As shown, FIG. 7 displays the policy type as an "auto" insurance policy, the auto product type as "standard auto" insurance, the form code as "all form codes", and a type of vehicle such as, for example, private passenger. "Submit" may be selected after the user is satisfied that the summary is correct. Otherwise, the user may select "cancel" to cancel the request, or the user may select "previous" to go back to the display screen of FIG. 6 to re-enter the requested information.

Figure 8:
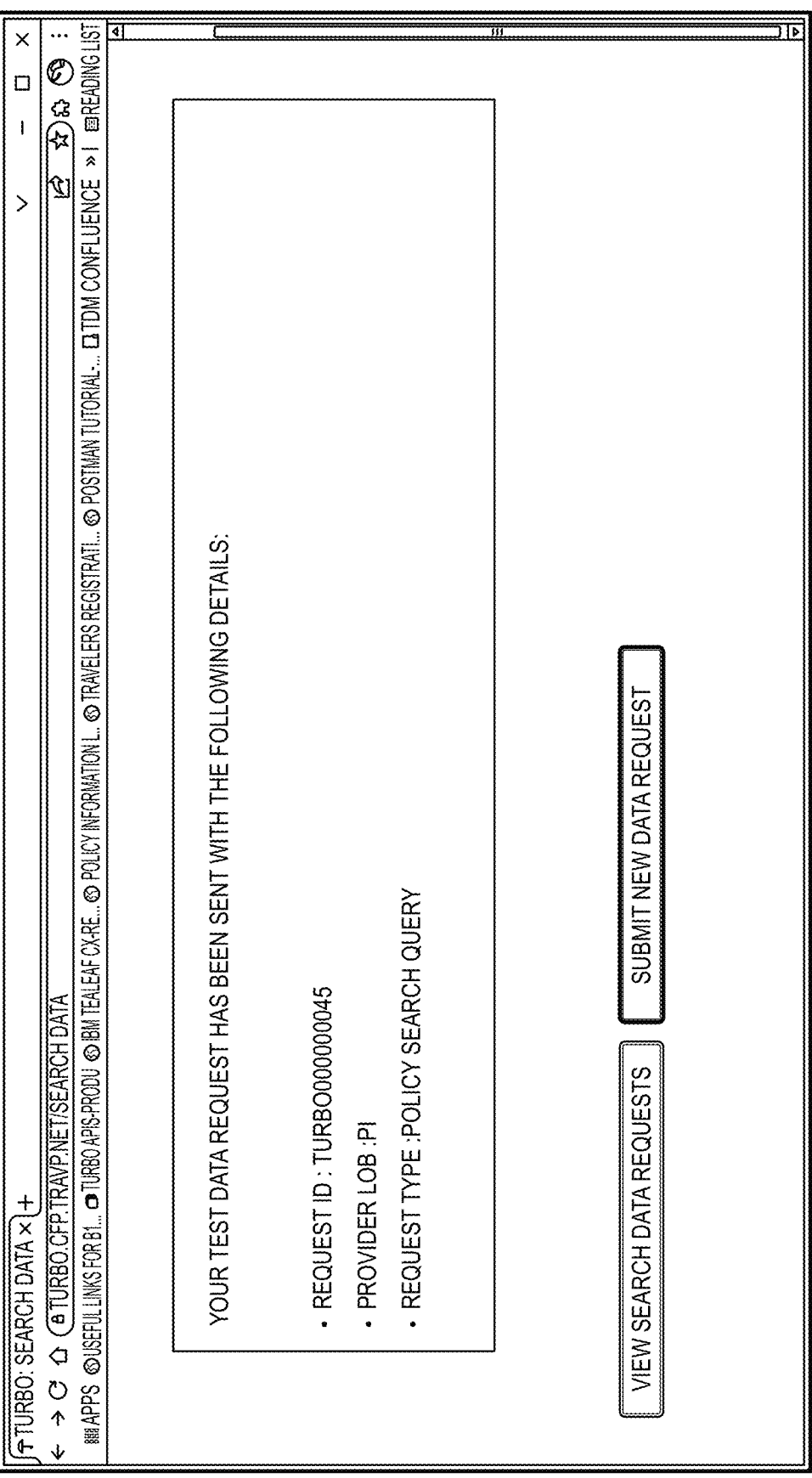
FIG. 8 is an example display screen that confirms the sending of a data request and displays information regarding the data request, according to embodiments.

If the user 303 selects "submit", as shown in FIG. 7, to create and publish the request to request router 106, which routes the request to one or more listening FAPIs based on the routing key, the system may present to the user a display screen for example as shown in FIG. 8, which indicates to the user that the data request has been sent. FIG. 8 may also show other information associated with the request, such as a request ID, which in this example is "TURBO000000045", a provider LOB, which in this example indicates property insurance ("PI"), and a request type, which in this example is a "policy search query".

Figure 9:
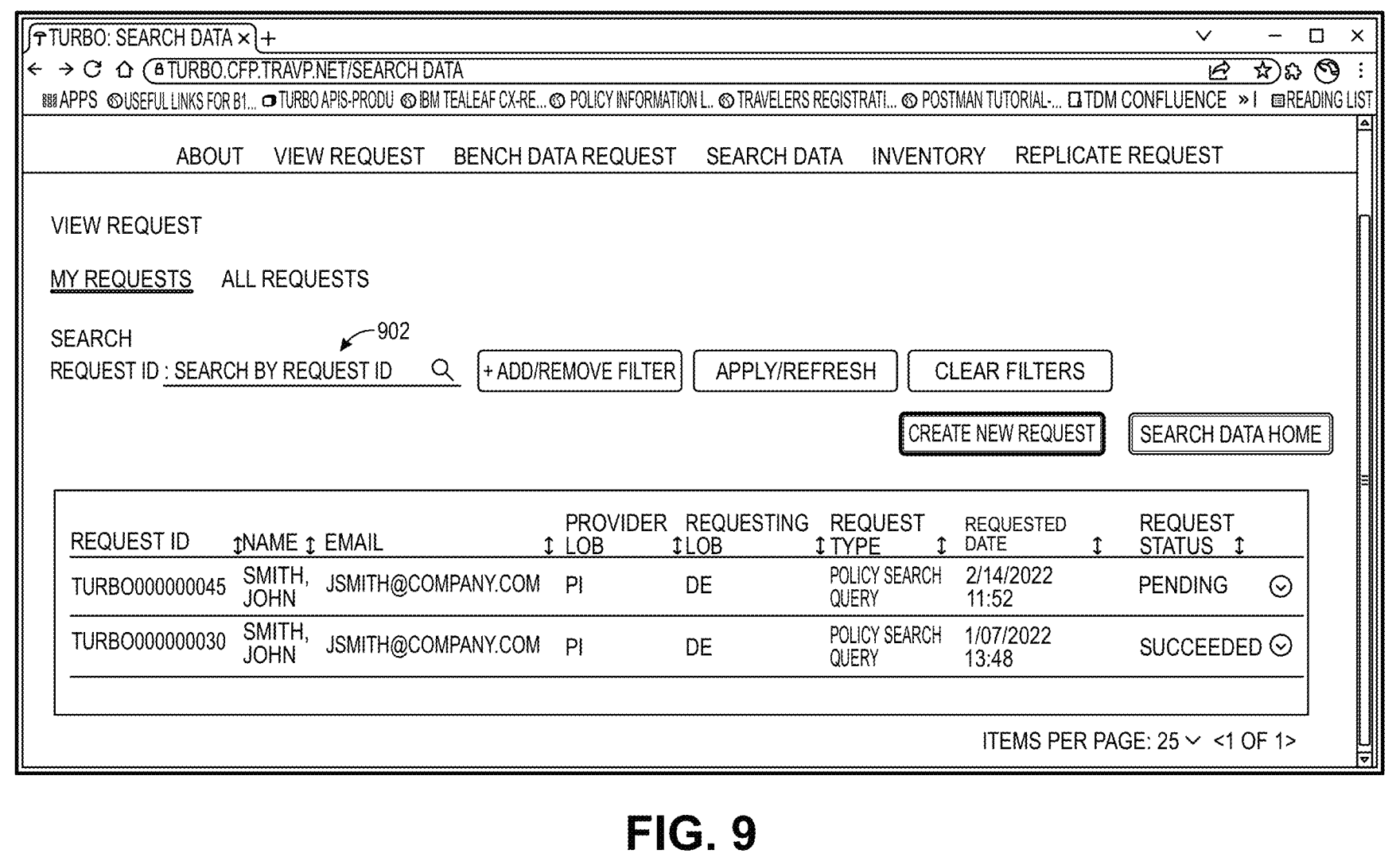

In various embodiments, user 303 may activate the "view search data requests" control to see pending requests and their respective statuses, which then may be displayed as shown in FIG. 9. In the example of FIG. 9, the user, John Smith ("JSMITH@company.com"), selected "My Requests" so that only John Smith's requests may be shown along with their respective statuses. If the user selects "All Requests", the user may see requests from all users and the respective statuses of the requests. The user may search for a request by a particular request ID, which may be entered at 902 on the display screen of FIG. 9.

Figure 10:
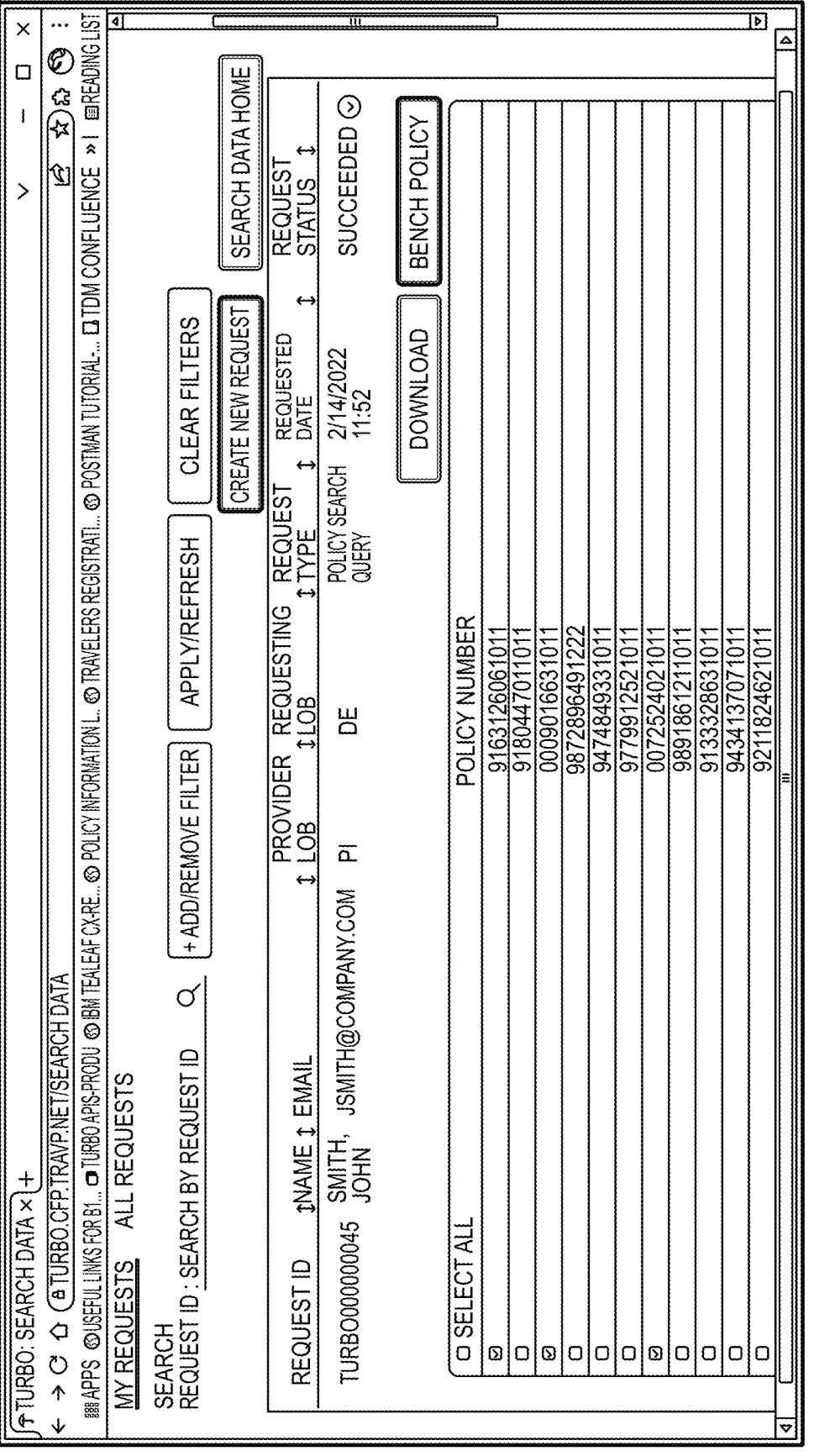
FIG. 10 shows policy numbers included in acquired data associated with a successful request when a user selects the successful request from the display screen of FIG. 9, according to embodiments.

If the user selects a successful request from the view request screen of FIG. 9, then the data that the system gathered or acquired for the successful request, such as policy numbers in this example, may be displayed as shown in FIG. 10. In various embodiments, the values of other data attributes also may be displayed on an interface similar to that shown in FIG. 10, including, for example, but not limited to, state, policy form, and auto/property, as well as other attributes and their values. The user may bench, (e.g., store or write), selected data records, such as selected policies, from this display screen by selecting one or more policies and then activating the control for "bench policy". Selections and control activations may be made by using a pointing device, a user's finger on a touch screen, or via other methods.

Figure 11:
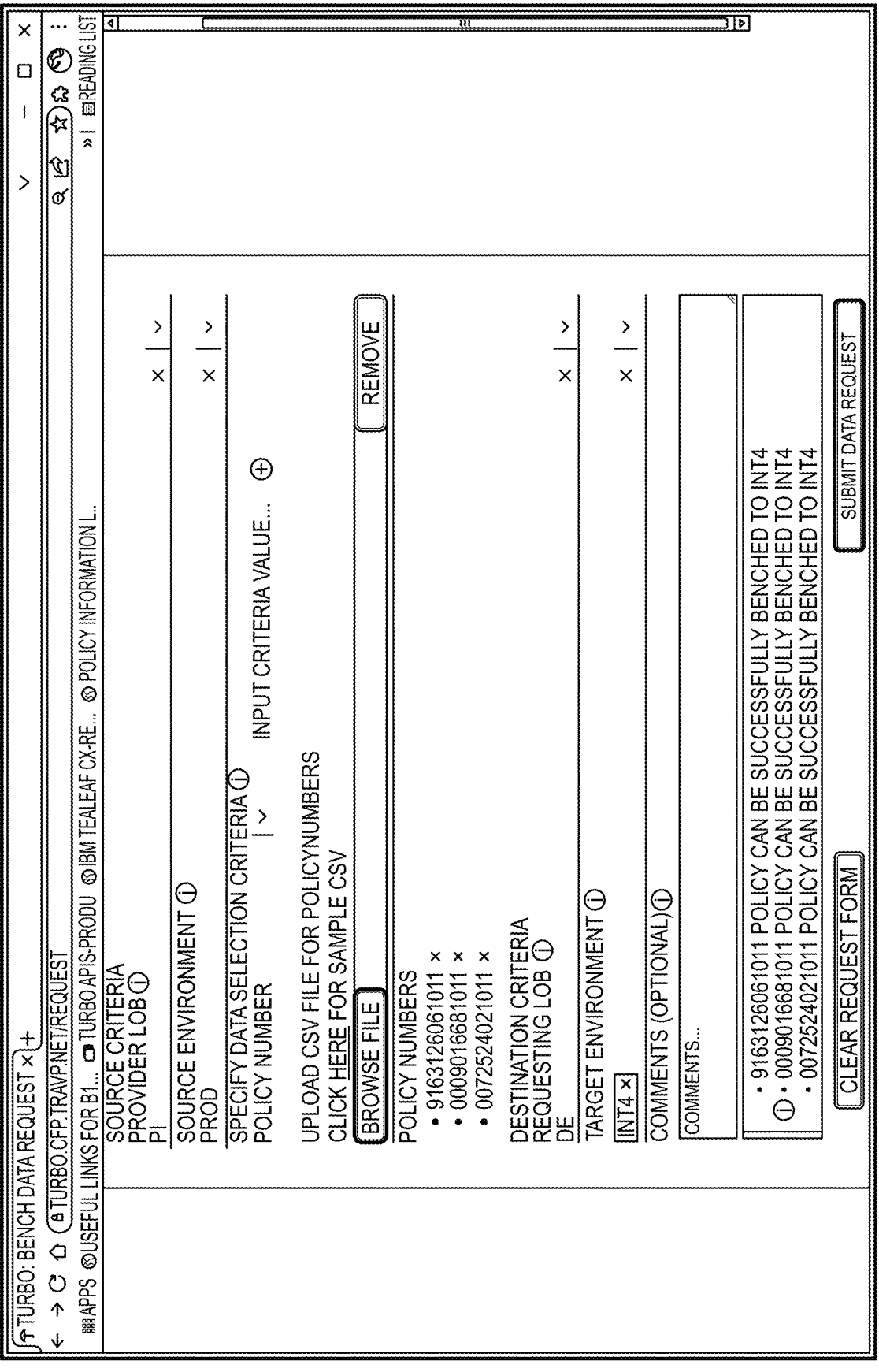
FIG. 11 illustrates an example display screen that may be displayed after a user selects "bench policy" from the display screen of FIG. 10.

After selecting "bench policy", the system may display a screen such as shown in FIG. 11. The upper half of this screen allows the user 303 to provide a source criteria, (e.g., criteria describing the source data environment 110), such as the provider LOB and the name of a desired source environment. The previously selected policy numbers are shown in this example display. Also in this example, the user may provide a csv file that includes desired policy numbers, if desired. The lower half of this screen allows the user 303 to provide destination criteria (e.g., criteria describing target data environment 108), such as the name of a requesting LOB, and the name of a target environment. The display screen of this example lists the provided policy numbers and indicates whether each of the policies can be benched to the target environment. Once the "Submit Data Request" control is selected, the desired policies and related data, such as billing data, may be benched, (e.g., copied or stored), in the target environment.

Figure 12:
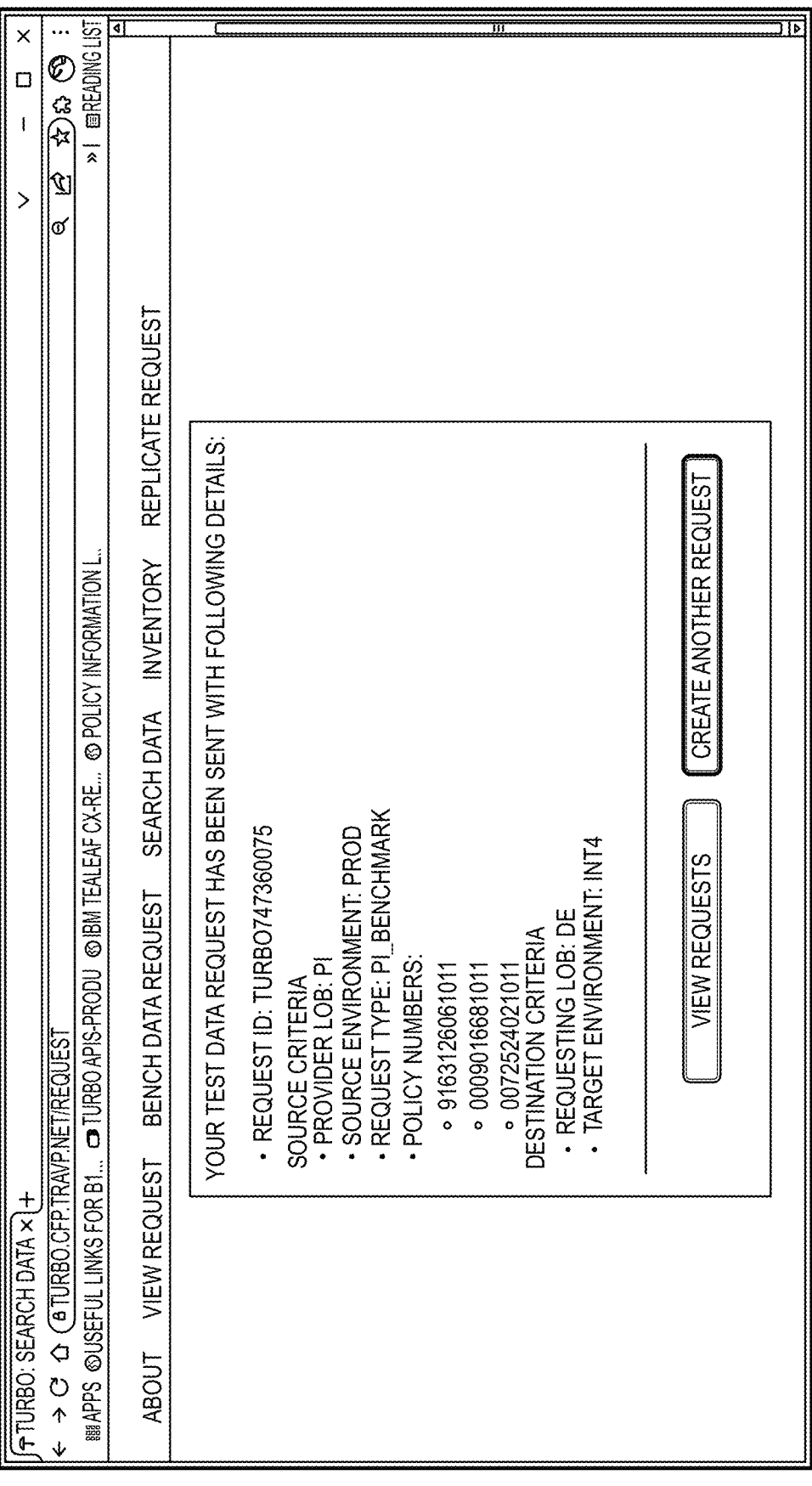
FIG. 12 illustrates an example display screen that may be displayed after a user selects "Submit Data Request" from the example display screen of FIG. 11 in order to confirm that the data request was sent and to provide details of the request, according to embodiments.

After selecting "Submit Data Request", the confirmation screen shown in the example of FIG. 12 may be displayed. The screen may confirm that the data request had been sent and may provide a number of details including, but not limited to, request ID, source criteria, and destination criteria. The source criteria may include provider LOB, source environment, request type and the policy numbers of copied policies. The destination criteria may include requesting LOB and the target environment.

An example search request screen, as shown in FIG. 13, may display either all user requests from a specific user, or all user requests from all users, as well as respective statuses of the requests (e.g. the requests received in 402) such as, for example, pending, succeeded, failed, or timeout. The example search request screen may provide other information including, but not limited to, request ID, username, user email, provider LOB, source environment, search parameters such as policy number(s), requesting LOB, target environment, request type, request date, and environment cleanup date.

FIG. 14 illustrates an example of an inventory data screen, which may show policy and account details captured at the time that data is copied from one silo to another (e.g., from the source data environment 110 to the target data environment 108). Other data also may be shown such as, for example, silo name, policy number, account number, first name, last name, phone number, ZIP code, date of birth, policy type, effective date, expiration date, policy status, reporting office code, account code, request type, requestor's email, and requested date.

Embodiments provide a number of advantages, including technical advantages. For example, a user need not have domain knowledge of a target domain. For another example, details that are not included in a request and that are expected by one or more FAPIs may be automatically provided by an intercept that obtains the details and completes the request. Further, if non-stale test data that satisfies a request is included in an inventory database, the non-stale test data is already stored to a target environment and there is no need to execute one or more FAPIs to acquire the test data and store a copy of the acquired test data to the target environment. This saves a large amount of computing resources, including saving processing time and reducing network communication bandwidth usage.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof. As used herein, the terms "A or B" and "A and/or B" are intended to encompass A, B, or {A and B}. Further, the terms "A, B, or C" and "A, B, and/or C" are intended to encompass single items, pairs of items, or all items, that is, all of: A, B, C, {A and B}, {A and C}, {B and C}, and {A and B and C}. The term "or" as used herein means "and/or."

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope of the invention. The embodiments were chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

Aspects of the present invention are described herein with reference to flowchart illustrations and/or block diagrams of methods, systems, and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computing system for satisfying a request for test data, the computing system comprising:

a processor;

a memory connected to the processor, wherein the memory includes instructions recorded therein that cause the computing system to perform operations comprising:

receiving the request for test data;

assigning a routing key to the request based on a type of request being made and a destination;

determining whether information related to the test data exists in a database;

responsive to the determining that the information related to the test data does not exist in the database, performing operations comprising:

sending the request, including the routing key, to at least one processor executing at least one function application program interface, when the at least one function application program interface receives the request, and the routing key matches a second routing key for which the at least one function application program interface is listening, performing operations comprising:

executing the at least one function application program interface to copy data specified by the request from a source data environment to a target environment to satisfy the request, and notifying an originator of the request that the request for the test data is successfully completed; and responsive to (i) the determining, by the computing system, that the information related to the test data exists in the database and to (ii) determining, by the computing system, that the test data is not stale data, performing an operation comprising:

notifying, by the computing system, an originator of the request that the request for the test data is successfully completed without having to search for and acquire the data from the source data environment.

2. The computing system of claim 1, wherein the at least one function application program interface includes a plurality of function application program interfaces executed in series in a particular order or in parallel.

3. The computing system of claim 1, wherein the operations further comprise:

responsive to the determining, by the computing system, that the information related to the test data that satisfies the request exists in the database and that the test data is stale data based on a type of the request, discarding the stale data.

4. The computing system of claim 1, wherein the operations performed in response to the determining that the information related to the test data does not exist in the database further comprise:

determining, by the computing system, that an intercept is required to obtain additional data for the request; and obtaining the additional data to enrich the request.

5. The computing system of claim 1, wherein the operations further comprise:

determining that a function application program interface that satisfies the request does not exist; and transmitting a notification of the request to an expert, wherein the notification includes information regarding manually satisfying the request.

6. The computing system of claim 5, wherein the operations further comprise:

adding one or more new function application program interfaces to satisfy the request.

7. The computing system of claim 1, wherein the operations further comprise:

storing the information related to the test data that satisfies the request in the database.

8. A non-transitory computer-readable storage medium including recorded thereon instructions for a processor of a computing system to perform operations comprising:

receiving a request for test data;

assigning a routing key to the request based on a type of request being made and a destination;

determining whether information related to the test data exists in a database;

responsive to the determining that the information related to the test data does not exist in the database, performing operations comprising:

sending the request, including the routing key, to at least one processor executing at least one function application program interface, when the at least one function application program interface receives the request, and the routing key matches a second routing key for which the at least one function application program interface is listening, performing operations comprising:

executing the at least one function application program interface to copy data specified by the request from a source data environment to a target environment to satisfy the request, and notifying an originator of the request that the request for the test data is successfully completed; and responsive to (i) the determining, by the computing system, that the information related to the test data exists in the database and to (ii) determining, by the computing system, that the test data is not stale data, performing an operation comprising:

notifying, by the computing system, an originator of the request that the request for the test data is successfully completed without having to search for and acquire the data from the source data environment.

9. The non-transitory computer-readable storage medium of claim 8, wherein the at least one function application program interface includes a plurality of function application program interfaces executed either in series in a particular order or in parallel.

10. The non-transitory computer-readable storage medium of claim 8, wherein the operations performed in response to the determining that the information related to the test data does not exist in the database further comprise:

determining, by the computing system, that an intercept is required to obtain additional data for the request; and obtaining the additional data to enrich the request.

11. The non-transitory computer-readable storage medium of claim 8, wherein the operations further comprise:

determining that a function application program interface that satisfies the request does not exist; and transmitting a notification of the request to an expert, wherein the notification includes information regarding manually satisfying the request.

12. The non-transitory computer-readable storage medium of claim 11, wherein the operations further comprise:

adding one or more new function application program interfaces to satisfy the request.

13. The non-transitory computer-readable storage medium of claim 8, wherein the operations further comprise:

storing the information related to the test data that satisfies the request in the database.

* * * * *